United States Patent
Arndt et al.

(10) Patent No.: US 6,635,329 B1
(45) Date of Patent: Oct. 21, 2003

(54) INSULATION ELEMENT

(75) Inventors: Rainer Arndt, Leverkusen (DE); Hans-Rudolf Czerny, Swistal (DE)

(73) Assignee: Illbruck GmbH, Leverkusen (DE)

( * ) Notice: Subject to any disclaimer, the term of this patent is extended or adjusted under 35 U.S.C. 154(b) by 0 days.

(21) Appl. No.: 09/367,126

(22) PCT Filed: Dec. 4, 1998

(86) PCT No.: PCT/EP98/07887

§ 371 (c)(1), (2), (4) Date: Nov. 12, 1999

(87) PCT Pub. No.: WO99/30074

PCT Pub. Date: Jun. 17, 1999

(30) Foreign Application Priority Data

Dec. 5, 1997 (DE) .......................................... 197 53 830
Oct. 22, 1998 (DE) .......................................... 198 48 677

(51) Int. Cl.[7] .............................. B32B 5/26; B32B 27/12
(52) U.S. Cl. .............................. 428/76; 428/68; 428/74; 442/381; 442/382; 442/383; 442/387; 442/388; 442/392; 442/394
(58) Field of Search ................................ 442/394, 381, 442/382, 383, 387, 388, 392; 428/68, 74, 76

(56) References Cited

U.S. PATENT DOCUMENTS

| | | | | |
|---|---|---|---|---|
| 5,102,711 A | * | 4/1992 | Keller et al. | 428/71 |
| 5,104,700 A | * | 4/1992 | Peterson | 428/34.5 |
| 5,571,592 A | * | 11/1996 | McGregor et al. | 428/71 |
| 5,806,154 A | * | 9/1998 | Tolbert | 28/103 |
| 5,811,167 A | * | 9/1998 | Norvell | 428/76 |
| 5,925,581 A | * | 7/1999 | Tolbert | 442/334 |

* cited by examiner

*Primary Examiner*—Cheryl A. Juska
*Assistant Examiner*—Christopher L. Pratt
(74) *Attorney, Agent, or Firm*—Martin A. Farber

(57) ABSTRACT

An insulation member (1) based on non-woven material, wherein In order to provide the insulation member based on non-woven it material, which is distinguished by fulfilling one or more requirements such as a high level of sound absorption and sound damping, high heat insulation and low formation of liquid water at high temperature gradients and high humidity gradients, a layered construction is provided from different non-woven materials such as padding-type (fleece) non-woven material or melt-extruded non-woven spun material.

8 Claims, 2 Drawing Sheets

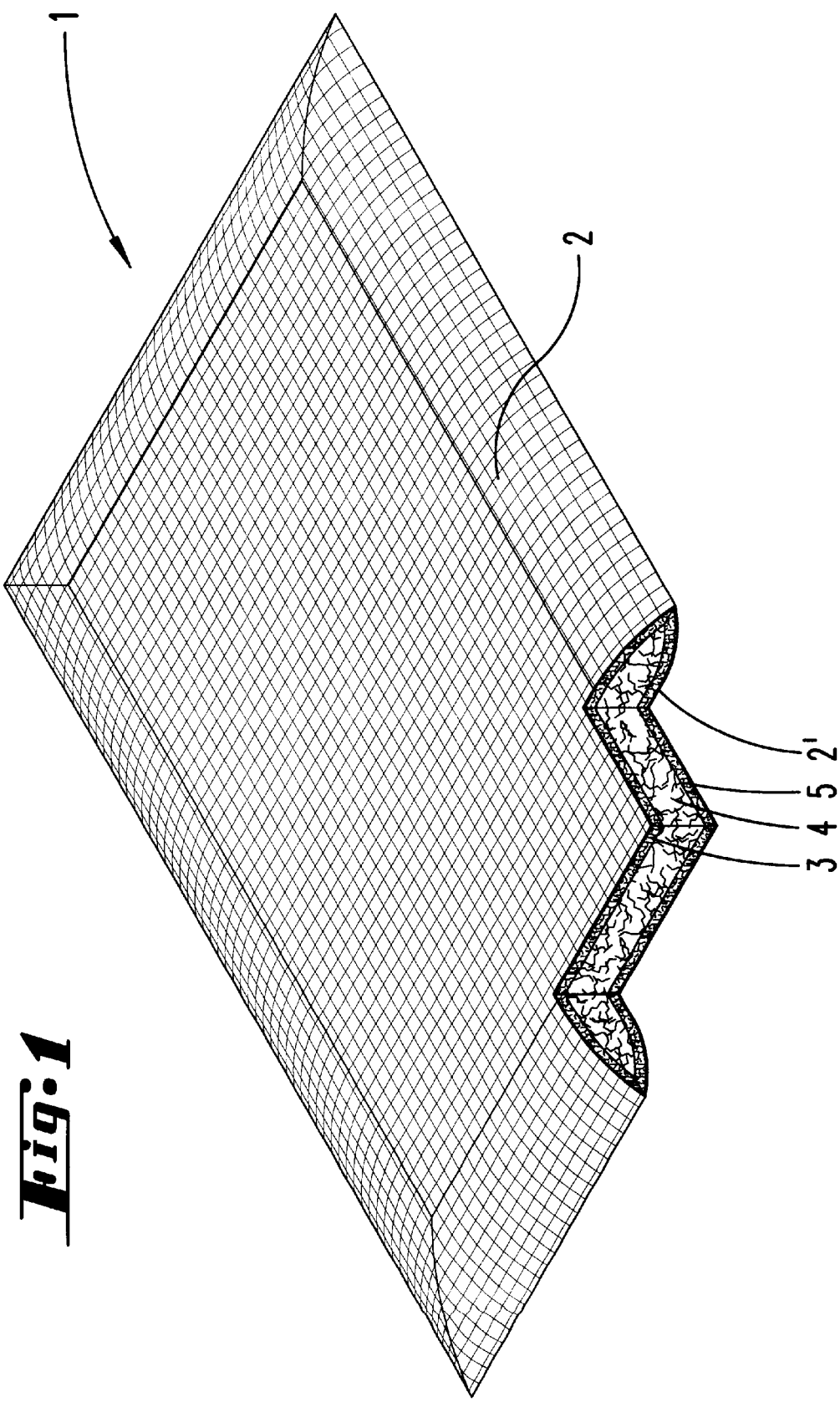

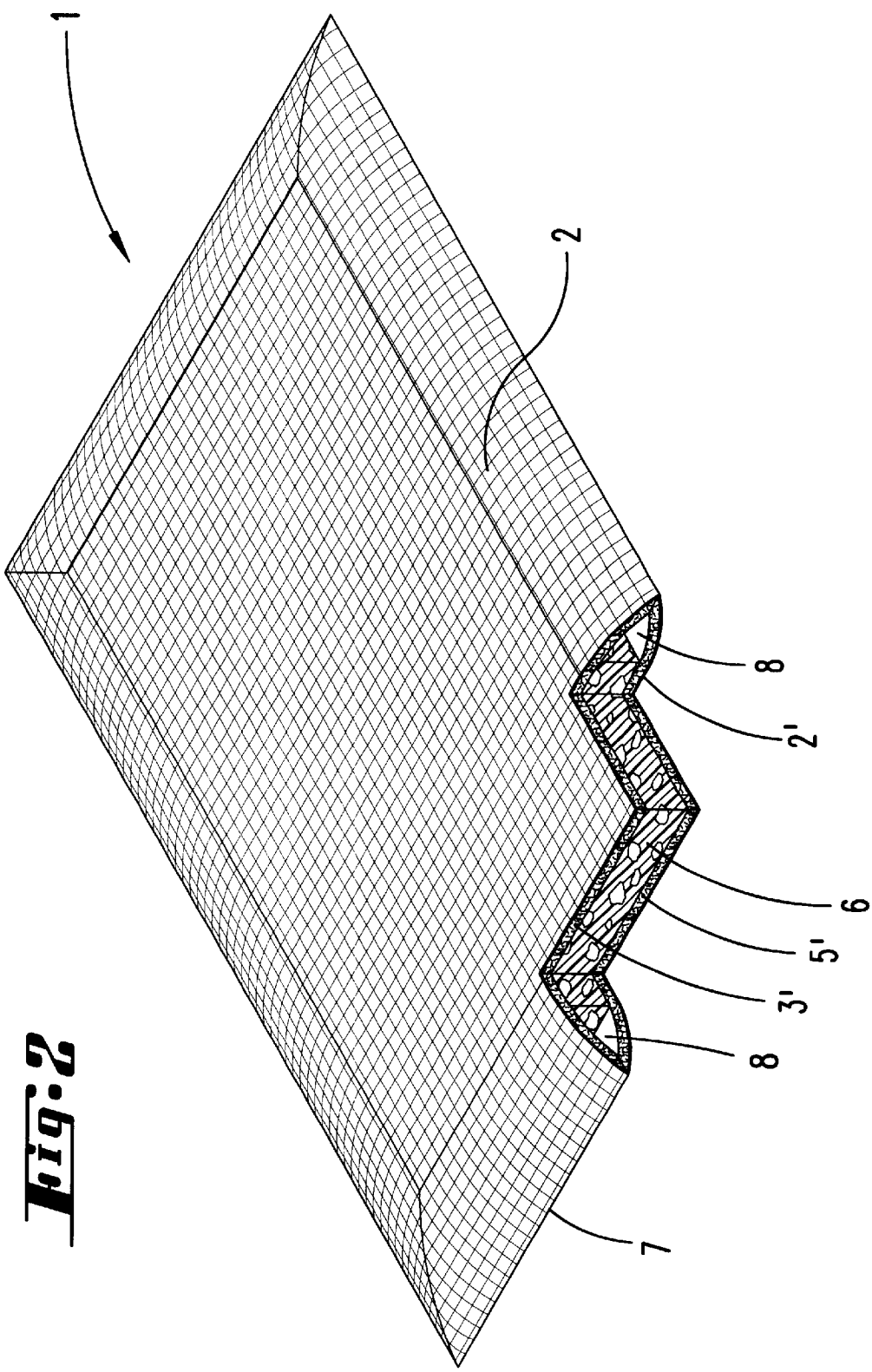

INSULATION ELEMENT

The invention relates to an insulation member based on a non-woven material.

Insulation members of this kind are already known in a variety of forms. The known insulation members are however still not satisfactory in every respect in regard to different requirements which are to be developed in ever more combinations. Among these requirements there are numbered a high level of sound absorption and sound damping (indicated by the absorption coefficient $a_s$, and the sound damping value R); in addition also, high heat insulation (indicated by lambda), as well as low formation of liquid water in the event of large temperature gradients and high humidity gradients; these also combined to the greatest possible extent with comparatively low weight per unit area and ease of handling as a member to be installed.

SUMMARY OF THE INVENTION

The invention is therefore concerned with the technical problem of providing an insulation member based on a non-woven material which is distinguished by fulfilling one or more of the above-mentioned requirements to a high degree.

This technical problem is first and foremost solved wherein it is provided that the insulation member has a layered construction of different non-woven materials. In addition, this technical problem is also solved by the insulation member having a layered age construction of different foamed material. In the first-mentioned case, the different non-woven materials may also be combined with one or more foamed material layers and in the second-mentioned case, the different foamed materials may also be combined with one or more layers of non-woven material. The preferably different-degrees of density are advantageously achieved by different fibers and/or manufacturing methods for the non-woven material and/or foamed materials of different densities. A layer of non-woven material or a layer of foamed material, for example a non-woven material layer or a foamed material layer of a polyimide foamed material, is formed to be of very light weight for comparatively great volume. There are quite large intermediate spaces between the fibers. A further layer of non-woven material, here in the exemplary case, a melt-extruded non-woven spin material, is made more dense. By bringing together in layered manner different non-woven materials or non-woven material and foamed materials, the different properties are used in combination, in particular in regard to sound absorption. It is particularly preferred to provided the central layer as a layer of fleece non-woven material or as a layer of foamed material with very low volume weight, and to locate on each side of such a central layer, a non-woven material of a higher degree of densification, for example a layer as melt-extruded non-woven spin material. The central layer is also preferably formed with a greater thickness than the other layers, in particular the further layers of non-woven material; in the exemplary case, the further layers are the layers of melt extruded non-woven spin material. The layer of non-woven material of lesser density, here therefore preferable the central layer, has preferably also a thickness which in a multiple of the thickness of the layer of non-woven material of greater density, here therefore the two further non-woven material layers of melt-extruded non-woven spin material. The layers of non-woven material may also be covered over by layers of film. In particular, the layers of film are provided as outer layers. The layers of film may also be provided as intermediate layers. The outer films are further prefeably welded at the edge, but the layers of non-woven material or the layers of foamed material may be integrated in full or in part into the weld seam, substantially by compression to almost nil at the edge of the layers of non-woven material or of the layers of foamed material. Such compression at the edge may also be used to form a structural member. Fixing members may also be integrated into such a weld seam. The bringing together of the outer films is in this regard in a manner suitable for the entire connection to be held together solely by the films and optionally the layers of non-woven material or of foamed materials, connected at the edge or welded at the edge. An adhesive, a coating or the like for the individual layers is not required and is preferably also not provided. The layers are merely laid over one another in simple manner—in each case outside the edge region. There in formed as it were a cushion having a cover provided by the outer films. Compressed regions resulting from welding, especially in the edge region, may in part contribute to accommodating fixing members and/or stiffening for the structural member. The multiple layers of non-woven material, optionally with integrated layers of foamed material, lead to a kind of pillow-type filling. It is of importance to the product that the formation of liquid water in the structural member is reduced. The films used, both the outer films and also optionally intermediate films, are also used which have directionally active permeabilities to water vapour. Preferably films are also used which have directionally active permeabilities to water vapour. Films may also be used which have moisture-dependent and/or temperature dependent permeabilities to water vapour.

BRIEF DESCRIPTION OF THE DRAWINGS

The invention is described further below with reference to the accompanying drawings: which however shows only exemplary embodiments. In the drawings:

FIG. 1 shows a partially sectioned perspective view of an insulation member of a first embodiment; and FIG. 2 shows a representation corresponding to FIG. 1 of a second insulation member.

DETAILED DESCRIPTION OF THE PREFERRED EMBODIMENTS

The insulation member 1 is made of a lower and an upper cover film 2, 2' respectively and of three central layers 3, 4 and 5 of non-woven material. The layers 3 and 5 of non-woven material are formed from similar or dissimilar non-woven material. The fibers of the non-woven material are made of a polymer such as for example PPS (polypropylene sulfide) or a mixture of PPS (polypropylene sulfide) and co-polyesters or other organic or inorganic fibers. The weight per unit area of the layers 3, 4 and 5 of non-woven material is between 50 and 800 g/m$^2$.

The fibers are thermoplastic and are inherently non-inflammable. The granules from which the fibers of non-woven material are derived have a specific melting viscosity.

The non-woven materials are hydrolysis resistant. In addition, they are acoustically absorbing and damping. Furthermore they also act in a heat insulating manner.

The thicknesses of the layers 3 and 5 of non-woven material are—in the uncompressed state—approximately $\frac{1}{3}$ to $\frac{1}{10}$ of the thickness of the layer 4 of non-woven material, preferably approximately $\frac{1}{5}$ of the thickness of the layer 4 of non-woven material. The thickness of the layer 4 of non-woven material is in absolute terms in the region of from 1 to 8 cm, preferably of the order of about 5 cm.

The film layers 2 and 2' are fiber-reinforced films of relatively thin thickness. The thickness is between 10 and 50 um, preferably of the order of 20 um. The density is of the order of approximately 0.9 to 1.4 g/cm³. The films are at the same time thermoplastic and hydrolysis-resistant. In particular, they have water vapour permeabilities which are matched to one another.

In regard to materials, inherently non-inflammable polymers may be in question. As fibers, there may be coated on for example glass fibers, but also melamine resin fibers. The fibers are indicated in the drawing by the grid. They are however preferably provided on only one side of the film. The grid is between 1 and 5 mm. In each case, fibers are provided running at right angles to one another.

As a whole, the insulation member 1 is a combination of three-dimensional and two-dimensional textile non-woven fabrics and films and/or foamed materials.

The layers 3, 4, 5 of non-woven material may also be replaced by one or more layers of a foamed material, such as for example panel-form articles of polyimide foamed materials.

In FIG. 2, an equivalent embodiment is shown.

In the following, in general only the differences from the insulation member according to FIG. 1 are explained. Otherwise, reference is made to the foregoing description of the insulation member 1.

In the embodiment of FIG. 2, a central panel-form article 6 of polyimide foamed material is provided which is covered over on each side by layers 3' and 5' of non-woven material. The layers 3' and 5' of non-woven material are arranged to extend right to the edge 7, while the panel-form article 6 of foamed material ends before the edge 7. There thus results a gusset 8. In practice however, this gusset 8 may also be filled with panel-form foamed material, for example by corresponding compression of the edge. Moreover, the panel-form foamed material may also be arranged to extend right up to the edge 7, by corresponding compression for example in the course of welding. In regard to the panel-form foamed material 6, there is in question in the exemplary embodiment polyimide foamed material.

We claim:

1. Insulation member comprising in order a thermoplastic film outer layer (2), a melt-extruded non-woven spun material layer (3), a fleece non-woven material layer (4), a melt-extruded non-woven spun material layer (5), a thermoplastic film outer layer (2') wherein the weight of the non-woven layers being substantially between 50 and 800 g/m², and wherein the film outer layers (2, 2') are welded at the edge to hold the layers together, and wherein the non-woven materials are made of polypropylene sulfide (pps) or a mixture of pps and organic or inorganic fibers.

2. Insulation member according to claim 1, wherein the layers (2, 2') of film are membrane films permeable to water vapor.

3. The insulation member as claimed in claim 1, wherein the film is fiber reinforced.

4. The insulation member as claimed in claim 1, wherein the film is of a thickness substantially between 10 and 50 μm.

5. The insulation member as claimed in claim 1, wherein the non-woven materials are acoustically absorbing and damping.

6. Insulation member according to claim 1, wherein the layer (4) of non-woven material is thicker than the layers (3, 5) of melt-extruded non-woven spun material.

7. Insulation member according to claim 1, wherein the layer (4) of fleece non-woven material has a thickness which is several times the thickness of the layers (3, 5) of melt-extruded non-woven spun material.

8. Insulation member according to claim 7, wherein the thickness of the fleece non-woven material layer (4) is approximately three to ten times the thickness of the layers of the melt extruded non-woven spun material.

\* \* \* \* \*